April 20, 1926.
D. W. PERIN
PARCEL DELIVERY
Filed July 6, 1923
1,581,689
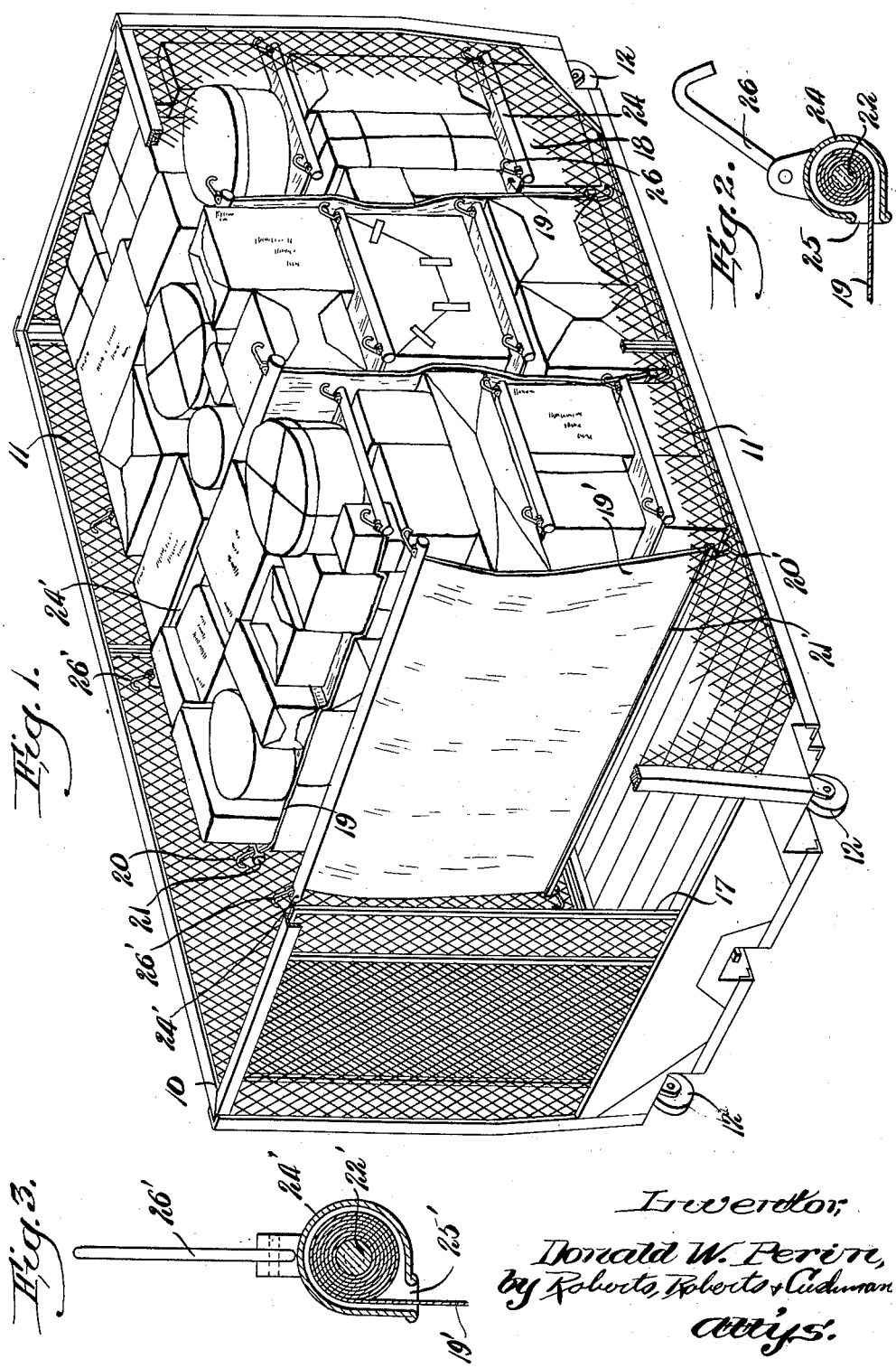
Inventor,
Donald W. Perin,
by Roberts, Roberts & Cushman
Attys.

Patented Apr. 20, 1926.

1,581,689

UNITED STATES PATENT OFFICE.

DONALD W. PERIN, OF BROOKLINE, MASSACHUSETTS, ASSIGNOR, BY MESNE ASSIGNMENTS, TO PERIN-WALSH COMPANY, OF BOSTON, MASSACHUSETTS, A CORPORATION OF MASSACHUSETTS.

PARCEL DELIVERY.

Application filed July 6, 1923. Serial No. 649,843.

*To all whom it may concern:*

Be it known that I, DONALD W. PERIN, a citizen of the United States of America, and resident of Brookline, in the county of Norfolk and State of Massachusetts, have invented new and useful Improvements in Parcel Delivery, of which the following is a specification.

This invention relates to an improved method of segregating groups of parcels and to improved apparatus for carrying out said method. It is particularly applicable to the needs of retail stores, express companies and similar establishments in which a great many parcels or packages have to be delivered to different addresses.

Statistics show that at present only one quarter of the time of a delivery vehicle driver is occupied in the actual delivery of goods and that the remaining time is taken up in loading, sorting and similar work, so that the trucks are idle approximately three quarters of the time. This necessitates about four times as many trucks as would be required if all the trucks could be continuously utilized in the actual delivery of goods; and in view of the large cost of trucks, garage space, upkeep, etc., the cost of delivering parcels is grossly excessive.

Some saving has been accomplished through the use of the mechanism illustrated in copending application Serial No. 598,312 filed November 1, 1922. In that application is illustrated a vehicle and a removable container which may be applied to the vehicle so that the load to be delivered may be packed in the container at the warehouse or shipping room and it is merely necessary for the deliveryman to drive up and have the loaded container placed within the vehicle. In the use of this container, however, the goods for a particular section are ordinarily simply lumped into the container and no attempt is made to pack them in best routed order of delivery. Also in view of the great disparity of sizes and shapes of the numerous parcels forming the ordinary delivery load such packing in the container renders the distribution of the individual parcels very difficult.

The object of the present invention is to provide an improved method and apparatus for segregating groups of parcels which will greatly facilitate their delivery. By the use of this method a more scientific routing is possible since the packages forming a particular load may be sorted in small bins or the like at the shipping terminal, and, when a container is to be sent out, may be removed in segregated groups from the small containers and each group separately packed in a suitable partitioned off space within the container. As a result, when completely packed, the various parcels will be arranged in proper order for delivery, saving any rehandling or rearrangement by the driver or retracing of steps due to overlooking of parcels which should be delivered at a particular point on the route.

In its broad aspect the invention comprises the method of preparing a number of articles for distribution characterized by sorting out or arranging the packages in small related groups intended to be delivered within a particular area, suitably routing the delivery groups and assembling the various groups in segregated relation in a delivery truck, preferably in a movable container which may be shifted on to a vehicle body, presenting the packages to the driver of the truck in the order in which they are to be delivered by him.

In a more specific aspect the invention contemplates a container for use in carrying out the invention having apertured or open mesh sides for cooperation with attaching members on flexible adjustable partitions which may be inserted vertically and transversely in the container to segregate the particular groups of parcels irrespective of the shape or size of the parcels.

The invention further contemplates the use in connection with these flexible partitions of suitable members such as spring actuated, cased rollers on which the partitions may be wound to adjust their length so that the partitions may be progressively lowered or shortened to successively expose different groups and render the groups readily accessible without entire removal of the partitions.

For facility of understanding the invention a characteristic embodiment has been illustrated in the accompanying drawings in which:—

Fig. 1 is a perspective view of a package container, one side of the container being broken away;

Fig. 2 is a transverse sectional view of the roller member for a horizontal partition; and Fig. 3 is a transverse sectional view of the roller member for a vertical partition.

In the drawings the container is shown as comprising a metal frame work 10 enclosed by the mesh or lattice walls 11 and having rollers 12 to facilitate movement of the container and its insertion within the body of a vehicle. It is to be understood that the container may be a part of the vehicle body which is preferably removable and that it has a movable door or closure 17, designed to open toward the front of the vehicle and to give the driver access to the interior of the container, so that he can remove the parcels in order of the delivery while occupying the driver's seat.

To save space at the delivery or shipping room it has been the frequent custom to load the parcels into a vehicle or container and have the driver take them out to the section at which they were to be delivered and there sort the packages according to his idea of routing and delivery. This involves both danger of loss of parcels during the sorting (which is ordinarily performed on the sidewalk) and also great waste of the driver's time and that of the vehicle employed for delivery, economy in delivery requiring that the maximum actual service hours be obtained from each delivery vehicle.

According to the present invention the shipping room is preferably divided into sections corresponding to the sections covered by different delivery men and in addition has small routing bins designed to receive and segregate parcels for a particular limited area. When a delivery is to be made in accordance with the present invention, the shiftable container is moved adjacent the bins in inverse order of delivery, the last package to be delivered, as for example the package 18, and the other packages in its particular bin are then placed in the bottom of the container at one end, after which a suitable partition member is secured in place to segregate this particular group of parcels.

This partition member is indicated as comprising the flexible canvas or like member 19 having on one end hooks 20 preferably connected by a stiffening bar 21. These hooks are adapted to interlock with the meshes of the side 11 of the container at one end while at the opposite end the flexible partition passes around roller 22. This roller is journaled in casing 24 open as at 25 and wound by spring (not shown) to normally keep the partition member under tension and to wind up the partition member into the casing as the tension is released. The casing carries hooks 26 by which it may be secured to the opposite wall of the container.

These partition members are preferably constructed of varying sizes for horizontal positioning within the container and a series of partition members are also provided of size to extend vertically of the container and divide it into vertical compartments, the parts of the vertical partitions being similarly constructed and similarly designated in the drawings. The roller end of each vertical partition may be at either the top or the bottom but by placing it at the top the fabric does not move as a whole but is taken up by the spring roller at the top, thereby avoiding frictional resistance of the packages against the fabric.

In use, the first segregated group having been packed and set off by suitable partition, additional groups divided by horizontal partitions are placed at the end of the container. These several groups are then segregated as an entirety by a vertical partition member such as indicated at 19'. This partition is flexible and will accommodate itself to the shape and outline of the parcels in the first division. The remainder of the container is then similarly packed and in such manner that the first parcels to be delivered will be at the top front of the container, the several partitions holding the parcels securely in place and preventing their shaking about or getting out of order irrespective of whether the container is full or partially empty.

In delivering the parcels, when the driver approaches his particular area, he will ordinarily loosen the front partition member and drop it sufficiently to expose the first group, securing it in partially lower position by reengagement of the end hooks 26' with the sides of the container. The first group of parcels having been delivered, the partition is again lowered and the horizontal partition removed to expose the second group. This progressive lowering of the partitions holds all succeeding groups in position and prevents disarrangement of their order. On such lowering the spring will take up the slack of the fabric 19' and when the partition has served its purpose it will be in a small roll in the bottom of the container.

In the foregoing it will be apparent that by the use of the improved method of distributing of parcels forming the subject matter of this invention the driver's time may be utilized entirely for delivery purposes, the routing of deliveries being performed by experts in that particular line, thus insuring most efficient routing and making it possible for the driver to simply interchange an empty container for a properly filled container and proceed with the parcel distribution.

I claim:

1. The method of preparing a plurality of articles for distribution which consists in segregating selected groups and holding together the units of each group, characterized by flexibly partitioning said groups from each other.

2. The method of preparing a number of articles for distribution which consists in segregating selected groups and holding the articles in a common container while maintaining the segregation of the groups, characterized by flexibly partitioning said groups from each other.

3. The method of preparing a number of packages for distribution which consist in separately grouping the packages and subsequently assembling the groups in a single container while maintaining the identity of the individual groups, characterized by flexibly partitioning the individual groups from each other.

4. The method of preparing a number of packages for distribution which consists in separately grouping the packages and subsequently assembling the groups as such in a single container in inverse order of distribution, characterized by flexibly partitioning said groups from each other as they are assembled.

5. The method of distributing packages which consists in arranging the packages in groups, assembling the groups in segregated relation in a movable container and flexibly partitioning the same from each other in said container and shifting the container to a delivery vehicle.

6. The method of distributing packages which consists in inserting the packages in predetermined order in a container and variably fitting flexible partition members in the container to separate different groups of the packages.

7. The method of preparing packages for distribution which includes arranging the packages in a container in inverse order of distribution from bottom to top and from end to end characterized by flexibly partitioning the segregated groups from each other.

8. The method of preparing packages for distribution characterized by arranging the packages in a container in inverse order of distribution from bottom to top and from end to end and separating the packages into groups by interposition of partition members during the packing thereof.

9. The method of preparing packages for distribution characterized by arranging the packages in the container in inverse order of distribution from bottom to top and from end to end and separating the packages into groups by interposition of partition members conformable to the outline of said groups during the packing of the latter and subsequently securing the container to a delivery vehicle body whereby the packages are presented to the vehicle driver in properly routed order for distribution.

10. The combination with a parcel container, of a plurality of flexible partitions adjustably mounted therein.

11. Delivery apparatus including a shiftable container, flexible partition members for dividing the container, and means for securing the partitions in desired adjusted relation to the container.

12. Delivery apparatus including a shiftable container, flexible partition members for dividing the container, and means for securing the partitions in desired adjusted relation to the container, said means comprising hooks on one of said parts, and means on the other of the parts interlocking with the hooks.

13. Delivery apparatus including a shiftable container, flexible partition members for dividing the container, and means for securing the partitions in desired adjusted relation to the container, said means comprising hooks on the partitions interlocking with the walls of the container, said walls having apertures receiving the hooks.

14. Delivery apparatus including a container and adjustable partitions therefor having portions interlocking therewith, said partitions including a fabric body portion and a more rigid end piece.

15. Delivery apparatus including a container and adjustable partitions therefor having portions interlocking therewith, said partitions including a fabric body portion and a more rigid end piece, and an end member in the form of a roller, certain of the interlocking portions of the partitions being associated with the roller.

16. The method of distributing packages characterized by arranging the packages in groups, assembling the groups in segregated relation in a container through the use of partition members and progressively lowering the partition members to facilitate access to the packages.

17. A partition member for use in a delivery container comprising a casing, a spring actuated roller within the casing, a flexible partition member on the roller and attaching devices carried by the terminal portion of the partition member for attachment to the container.

18. The combination with a container having lateral walls of mesh formation, of partition members for use in the container comprising a flexible body portion and terminal hooks of size selectively to interlock with the meshes of the container walls.

Signed by me at Boston, Massachusetts, this 3rd day of July 1923.

DONALD W. PERIN.